Figure 1:
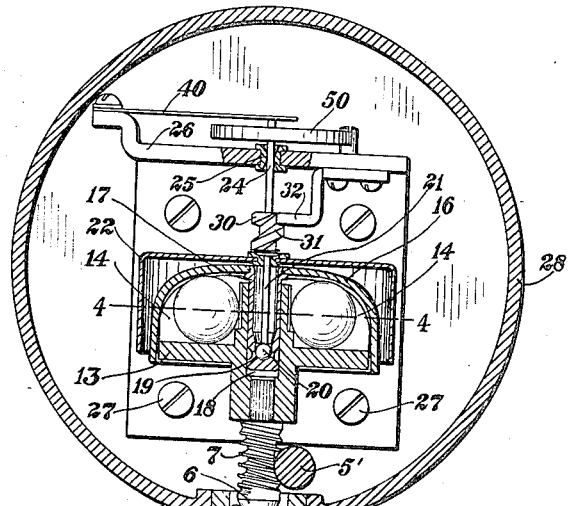

R. H. MANSON.
SPEEDOMETER.
APPLICATION FILED DEC. 26, 1913.

1,125,703.

Patented Jan. 19, 1915.

WITNESSES:
John F. Cherry
Frank M. Slough

INVENTOR.
Ray H. Manson
BY H. O. Richey
HIS ATTORNEY

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

SPEEDOMETER.

1,125,703.  Specification of Letters Patent.  Patented Jan. 19, 1915.

Application filed December 26, 1913. Serial No. 808,686.

*To all whom it may concern:*

Be it known that I, RAY H. MANSON, a citizen of the United States, residing at Elyria, in the county of Lorain and State of Ohio, have invented certain new and useful Improvements in Speedometers; and I do hereby declare the following to be a full, clear, and exact description of the invention, such as will enable others skilled in the art to which it appertains to make and use the same.

The invention disclosed in this application I regard an improvement over that of my application No. 725,422, filed Oct. 12, 1912.

In general, the invention of the present application relates to speedometers or speed indicating devices, which are especially adapted for use upon moving vehicles, such as automobiles, motor trucks and the like, and relates more especially to the means for transmitting the movement from the speed operated device to the speed indicating means.

While I have illustrated my present invention in connection with the invention shown in my said former application, it will readily be understood that some, if not all, of its features can be applied to any form of speedometer.

One of the objects of the invention of the present application is the simplification of the parts employed in the system for transmitting movement from the speed controlled devices to the indicating features, whereby the apparatus is simplified and cheapened, eliminating parts and operations in the processes of manufacture. The more particular object of the elimination of these parts is the elimination of difficulties encountered in starting the indicating features from zero, which difficulties result largely from the stiffness and loss of motion encountered in the employment of a number of parts. When few parts are used, and especially in the combination of parts as employed in my invention, the adjustment is close and responds quickly and accurately to the centrifugal motion produced at low speed.

Owing to the fact that the devices must be adjusted to take care of the centrifugal force at high speeds, which will be great at that time, the movement of the parts in response to low speeds is very slight, and unless there is a close adjustment and a ready response, there will be no or inaccurate indications at low speed, an objection to most of the present types of speedometers. By my invention I am able to start from zero easily at low speeds, and to accurately register the speeds all along the route.

By my invention I am also enabled to rotate the speed indicating features in the same direction as the member rotated by the apparatus whose speed is to be measured. By this arrangement the bearing friction is not opposed to the change which results from changes of speed, it being only necessary when there is a change of speed to overcome the friction resulting from the increase in speed of the rotated member, thus realizing a constant or substantially constant frictional response. The windage created by the rotating parts also assists in bringing about the change in the speed indicating features, so that they respond readily and quickly to any changes in the rate of rotation of the rotating member. I may also so construct and arrange the parts that advantage may be taken of the windage of the driven members.

I may also construct the indicating features of relatively massive parts, so that they will not respond to the jarring of the vehicle owing to the roughness of the road, or for other reasons, or to sudden and unauthorized changes in the speed of the vehicle. The scale will thus be steady and easy to read and not constantly vibrating and unsettled.

Other objects of my invention and the invention itself will probably be better understood from a description of a particular embodiment.

Figure 4:
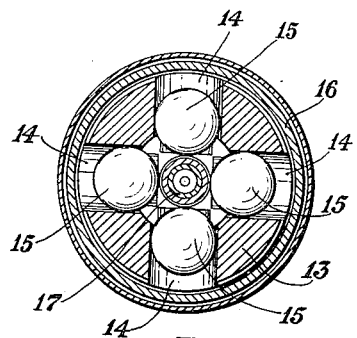
Figure 2:
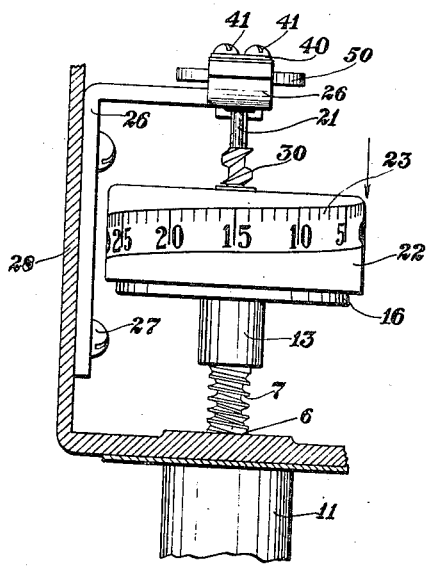
Figure 3:
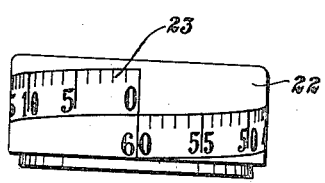

Figure 1 is a sectional view of an embodiment of my invention illustrating some of the parts in elevation. Fig. 2 is an elevation of the more essential parts of my invention. Fig. 3 is a front elevation of one of the speed indicating features. Fig. 4 is a section through the line 4—4 of Fig. 1, showing the balls in elevation.

Referring now to the drawings and to the embodiment of my invention illustrated therein, at 5 is shown a member which is rotated by the apparatus whose speed is to be measured, such as an automobile wheel. This member is provided with suitable means for rotating the speedometer shaft 6. In the form shown, threads 7 are illustrated upon this shaft which engage corresponding threads upon the odometer shaft 5′. The shaft 6 is set in a suitable bearing, such as 8 and may rotate upon ball-bearings shown at 9. Suitable means, shown at 10, is provided for adjusting the shaft 6. The bearing is inclosed within a hollow supporting member 11 and fastened therein by any suitable means, such as by threads 12.

A rotating member 13 is mounted upon the shaft 6, here shown as provided with a plurality of channels 14, in which balls 15 are inclosed. The channels are shown as at right angles to each other and as being perpendicular to the axis of rotation of the member 13, so that the balls in the channels move back and forth according to the rate of rotation of the member 13, being carried outward by the centrifugal force and returned by suitable means, which may be or include the weight of the parts.

Means are provided for converting the rotary motion of the member 13 into linear motion proportional thereto, which means, in the form shown, includes the balls above described, and a cup-shaped member 16, which fits over the member 13 and the balls 15, the balls 15 engaging the bottom of this cup-shaped member when they are moved outward and elevating it as they move outward.

A shaft, here shown as a hollow shaft, 17, is provided for the cup-shaped member and fits in a bore 18 in the rotary member 13. In the form shown, this is an axial bore. The hollow shaft 17 is provided with a bearing 19 in the bottom thereof in which a bearing, here shown as a ball-bearing sets. A device, such as a shaft 21, leads from the ball-bearing and supports one of the indicating features 22, here shown as a cup member fitting down over the member 16 and carrying a scale 23 which is here shown as a spiral scale, for a reason to be described. The shaft 21 continues being held at its upper end 24 in a bearing 25 formed in a bracket 26, which is connected by suitable means, such as screws 27 to a frame 28 supported from the support 11.

A member 30 is carried by the shaft which member is provided with a spiral thread 31. A lug 32 supported from the member 26 engages this spiral thread, causing the shaft 21 and parts carried thereby to rotate when the shaft is elevated or depressed. Means are provided for returning the shaft 31 and the parts carried thereby, which is here shown as a flat spring 40, supported by the member 26, to which it is fastened by any suitable means, such as screws 41. Means are also provided for returning the shaft 31 to the position from which it has been turned by the members 30, 31 and 32, which means is here shown as a spiral spring 50 connected at one end to the shaft and at the other end to the member 26.

The operation of the embodiment of my device illustrated in the drawing and above described is as follows: When the member 5 is rotated, the shaft 6 will be caused to rotate, rotating the member 13, whereupon the balls 15 will be caused by centrifugal force to move outwardly in the channels 14, the tops of the balls engaging the underside of the cup 16 and elevating the same. The shaft 21 will be elevated against the pressure of the spring 40. As the shaft is elevated, it carries upwardly the members 22 and 30. Owing to the engagement of the spiral thread with the lug 32, the shaft and the parts carried thereby will be rotated against the pressure of the spring 50, the parts being so arranged that the member 22 is rotated in the same direction as the members 13, 15 and 16, to take advantage of the windage of the parts and the lesser frictional resistance offered when rotated in this direction. The weight of the member 22, acting as a balance wheel, prevents unnecessary vibration, and this, together with the spring 50, holds the parts steady, so that the indications shown by the scale will be accurate and steady.

When the speed decreases, the centrifugal force with which the balls are moved outwardly decreases, the spring 40, together with the weight of the parts supported by the balls force the balls inwardly and the parts are returned, so that they come back to normal when the shaft 6 is no longer rotated.

The scale 23 is made spiral because the member 22 is elevated at the same time that it is rotated. The higher the speed, the lower the scale must be upon the member 22 to be visible through the slot ordinarily provided in the casing for devices of this kind, in a manner well known and which need not be described here.

I have shown in the drawing a particular embodiment of my invention for the purpose of illustrating the same. My invention is not limited to the details of this embodiment, or to the form thereof, but admits of many variations from both.

I claim:—

1. In a speedometer, the combination of devices rotated by the apparatus, the speed of which is to be measured, a vertically movable member rotatable to indicate the speed and provided with a spiral scale, and means to transmit the movements of said devices to said member.

2. In a speedometer, the combination of devices adapted to be rotated by the apparatus, the speed of which is to be measured, means for transforming the rotary motion of said devices into rectilinear motion, mechanism for indicating the speed including a vertically movable member provided with a spiral scale and apparatus operated by said means for rotating said member.

3. In a speedometer, the combination of devices adapted to be rotated by the apparatus whose speed is to be measured, including a rotatable member, a relatively massive member provided with a spiral scale for indicating the speed of the apparatus whose speed is to be measured and means including a cam controlled by said rotatable member for rotating said massive member in the same direction as the rotatable member is rotated.

4. In a speedometer, the combination of a member, means for rotating said member at a speed proportional to the speed of the apparatus, the speed of which is to be measured, means controlled through centrifugal force for transforming the rotary motion of said member to rectilinear motion, mechanism for rotating said last named means and a relatively massive member rotated thereby in the same direction as the rotatable member, said relatively massive member being provided with a scale for indicating the speed of the apparatus the speed of which is to be measured.

5. In a speedometer, the combination of a rotatable member adapted to be rotated by the apparatus, the speed of which is to measured, rectilineally movable parts and means for moving said parts rectilineally and proportionally to the rate of rotation of the movable member, means including a cam for rotating one of said rectilineally movable parts in proportion to its rectilinear movement and speed indicating means operated by said rotated rectilineally movable member.

6. In a speedometer, the combination of rectilineally movable means, centrifugally controlled apparatus for moving said means rectilineally in proportion to the speed of the apparatus, the speed of which is to be measured, mechanism for rotating said means in proportion to its rectilinear movement, and means for indicating the speed of said apparatus, including a relatively massive part carrying a scale rotated by said rectilineally movable means in proportion as it is rotated by said mechanism.

7. In a speedometer, the combination of a member driven by the apparatus, the speed of which is to be measured, a rotatable member rotated thereby, rectilineally movable means controlled by said rotatable member, means for moving said rectilineally movable means rectilineally in proportion to the speed of rotation of the rotatable member, mechanism including a cam for rotating said rectilineally movable means in proportion to the rectilinear movement thereof and means for indicating the rotation of said rectilineally movable means.

8. In a speedometer, the combination of a member driven by the apparatus, the speed of which is to be measured, a rotatable member rotated by said driven member, rectilineally movable means including a shaft and a cup provided with a scale, means controlled by the rotatable member for moving said shaft and cup in proportion to the speed of rotation of the rotatable member, a cam for rotating said cup and shaft in proportion to the movement given it by said rotatable member controlled means, and means including a scale for indicating the rotation of the cup.

9. In a speedometer, the combination of a member driven by the apparatus whose speed is to be measured, a rotatable member operated by said driven member, rectilineally movable means including a shaft and a cup carried thereby, mechanism controlled by the rotatable member for moving said shaft and cup rectilineally in proportion to the speed of rotation of the rotatable member, a cam and lug for rotating said shaft and cup in the direction of rotation of the rotatable member as said shaft and cup are moved rectilineally and means for indicating the amount of rotation imparted to the cup.

10. In a speedometer, the combination of a member adapted to be driven by the apparatus, the speed of which is to be measured, a rotatable member operated by said driven member, rectilineally movable means including a shaft and a cup, mechanism for moving the shaft and cup rectilineally in proportion to the speed of rotation of the rotatable member, a cam and lug for rotating said cup in the same direction as the rotation of the rotatable member and in proportion to the rectilinear movement imparted to the cup and shaft, and means including a spiral scale carried by the cup for indicating the amount of rotation imparted to the cup.

11. In a speedometer, the combination of a member driven by the apparatus the speed of which is to be measured, a rotatable member operated by said driven member, rectilineally movable means including a relatively massive member carrying a spiral scale, mechanism for moving said relatively massive member rectilineally in proportion to the speed of rotation of the rotatable member, a cam and lug for imparting to the relatively massive member a rotation proportional to the rectilinear movement thereof, said relatively massive member being rotated in the same direction as the rotatable member.

12. In a speedometer, the combination of a member driven by the apparatus whose speed is to be measured, a rotatable member operated by said driven member provided with a plurality of channels, rectilineally movable means, mechanism including centrifugally controlled balls in said channels and a cup-shaped member normally engaging the balls for moving said rectilineally movable means as said rotatable member rotates, devices for imparting to the rectilineally movable means rotation in proportion to the rectilinear movement thereof and means for indicating the amount of rotation imparted to said rectilineally movable means.

13. In a speedometer, the combination of a shaft adapted to be driven by the wheels of a vehicle, a speedometer shaft, means whereby said driven shaft operates said speedometer shaft to rotate the same, a rotatable member connected to said speedometer shaft and adapted to be rotated thereby, said rotatable member being provided with a plurality of ball carrying channels substantially perpendicular to the axis of rotation of the rotatable member, rectilineally movable means including a shaft and a relatively massive cup, mechanism for moving said means in proportion to the rate of rotation of the rotatable member, said mechanism including balls in said channels and a cup-shaped member extending over the rotatable member and engaging the tops of the balls, a cam and lug for rotating said rectilineally movable means in proportion to the rectilinear movement imparted thereto and in the same direction of rotation as that taken by the rotatable member, said rectilineally movable cup being provided with a spiral scale to indicate the amount of rotation imparted to said cup.

14. In a speedometer, the combination of a member driven by the apparatus, the speed of which is to be measured, rotatable means operated by said member, a member provided with a scale in juxtaposition to said rotatable means and means including a cam to rotate said scale member in proportion to the rate of rotation of the rotatable member and in the same direction of rotation.

15. In a speedometer, the combination of a member adapted to be driven by the apparatus, the speed of which is to be measured, a rotatable member operated by said driven member, speed indicating apparatus including a vertically movable cup-shaped member fitting over the rotatable member and means for rotating said cup-shaped member in the same direction of rotation as the rotatable member and in proportion to the rate of rotation thereof.

16. In a speedometer, the combination of a member carrying a spiral scale, centrifugally controlled means for moving said member vertically, and means including said centrifugally controlled means for rotating said member.

In witness whereof, I have affixed my signature in the presence of two witnesses this 19th day of Dec., 1913.

RAY H. MANSON.

Witnesses:
GEO. E. ROBERTS,
R. G. SANDS.